United States Patent
Yaniv

(10) Patent No.: US 6,259,501 B1
(45) Date of Patent: Jul. 10, 2001

(54) LIQUID CRYSTAL DISPLAY WITH DIELECTRIC LAYER HAVING AT LEAST TWO OPENINGS CORRESPONDING TO EACH PICTURE ELEMENT AND METHOD OF MAKING SAME

(76) Inventor: Zvi Yaniv, 5810 Long Ct., Austin, TX (US) 78730

(*) Notice: Subject to any disclaimer, the term of this patent is extended or adjusted under 35 U.S.C. 154(b) by 0 days.

(21) Appl. No.: 09/721,189

(22) Filed: Nov. 24, 2000

Related U.S. Application Data

(62) Division of application No. 09/200,571, filed on Nov. 27, 1998.

(51) Int. Cl.[7] .................. G02F 1/1333; G02F 1/1339; C08J 7/04
(52) U.S. Cl. ..................... 349/122; 349/86; 349/156; 427/510
(58) Field of Search .................. 349/86, 122, 156; 427/510, 595–596, 289, 521, 555; 156/99, 108, 145, 310

(56) References Cited

U.S. PATENT DOCUMENTS

| | | | | |
|---|---|---|---|---|
| 3,932,026 | * | 1/1976 | Sprokel ................................ | 350/160 |
| 4,868,616 | * | 9/1989 | Johnson et al. ....................... | 357/17 |
| 5,281,450 | * | 1/1994 | Yaniv .................................. | 427/510 |
| 5,576,070 | * | 11/1996 | Yaniv .................................. | 427/510 |
| 5,583,675 | * | 12/1996 | Yamada et al. ....................... | 349/84 |
| 5,623,353 | * | 4/1997 | Kanemoto ............................ | 349/122 |
| 5,625,473 | * | 4/1997 | Kondo et al. ......................... | 349/86 |
| 5,644,415 | * | 7/1997 | Aoki et al. ........................... | 349/122 |
| 5,905,548 | * | 5/1999 | Shimada ................................ | 49/38 |
| 5,978,064 | * | 11/1999 | Nishiguchi ........................... | 349/156 |

FOREIGN PATENT DOCUMENTS

WO 93/24240 * 12/1993 (WO).

* cited by examiner

*Primary Examiner*—William L. Sikes
*Assistant Examiner*—Tarifur R. Chowdhury

(57) ABSTRACT

A liquid crystal display device includes a substrate having one or more electrodes formed onto one major surface thereof. The substrate and electrodes are then coated with a layer of a dielectric material through which is formed a plurality of openings or vias. Into the openings is disposed a layer of a light influencing material, such as a color filter medium, a liquid crystal material, or an alignment material. In the embodiment in which the light influencing material is a liquid crystal material, it is possible to put one or more different liquid crystal materials into each opening. This allows two adjacent openings to project light of a substantially different character, based on the differing material disposed in each opening.

A method for forming a liquid crystal device such as that described above includes the step of providing a liquid crystal display substrate, and forming at least one, and preferably a plurality of electrodes on a surface thereof. Thereafter, a layer of dielectric material is formed onto the surface of the electrodes and substrate. The dielectric material is the treated, as by a laser, to form a plurality of holes or openings therein. Into the openings is disposed the light influencing material.

32 Claims, 3 Drawing Sheets

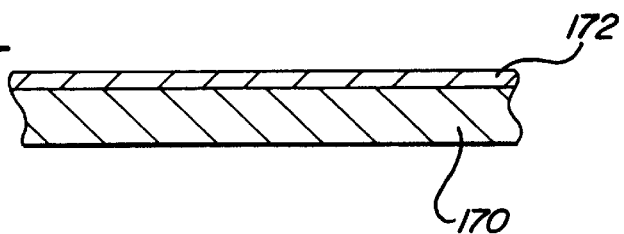
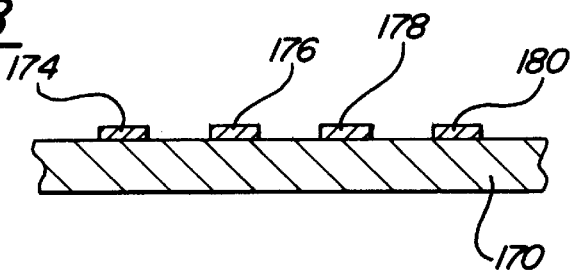
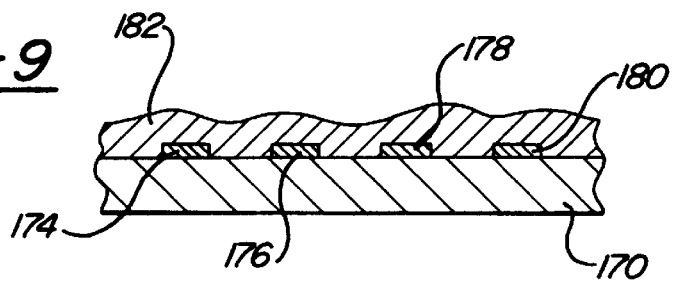
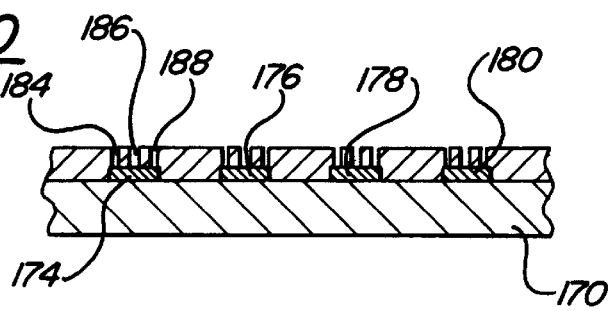
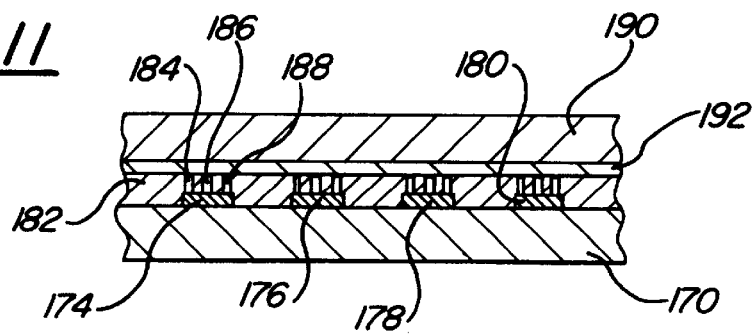

LIQUID CRYSTAL DISPLAY WITH DIELECTRIC LAYER HAVING AT LEAST TWO OPENINGS CORRESPONDING TO EACH PICTURE ELEMENT AND METHOD OF MAKING SAME

CROSS REFERENCE TO RELATED APPLICATIONS

This application is a divisional of Ser. No. 09/200,571, to Yaniv, entitled Liquid Crystal Display and Method of Making Same, filed Nov. 27, 1998.

TECHNICAL FIELD

This invention relates in general to a light influencing display device, and more particularly to a liquid crystal device formed by creating a plurality of cavities or openings in a material layer, and filling said openings with one or more liquid crystal materials.

BACKGROUND

Flat panel display devices are increasingly gaining market acceptance for a variety of different applications. For example, active matrix liquid crystal displays (AMLCDs) have found widespread use as the video monitors in laptop computers, video cameras, and avionic navigation modules, to name a few. Other types of displays, such as electroluminescent (EL) and field emissive displays (FEDs) are also used in a variety of industrial and consumer applications. The advantage of each of these types of devices resides in the fact that they are all substantially flat, particularly as compared to the cathode ray tube that has been the standard for the past fifty years.

In the AMLCD, the elements which cause the desired optical characteristic are typically sandwiched between a pair of thin glass plates. These elements include first and second patterned electrodes for applying an electrical field to liquid crystal (LC) material disposed therebetween. Each pair of oppositely disposed patterned electrodes define a single picture element or pixel. The liquid crystal material disposed between the electrodes is typically of a single type, such as twisted nematic (TN), supertwist nematic (STN), chiral smectic and others. The applications of an electric field to the LC material causes it to change its orientation from a first condition to a second condition, for example from transparent to opaque. However, in order to control the orientation of the liquid crystals, it is necessary to provide numerous other optical elements, such as polarizers and alignment layers. A conventional AMLCD is described in, for example, U.S. Pat. Nos. 4,666,252; 4,715,685 and 5,061,040, all to Yaniv, et al, the disclosures of which are incorporated herein by reference.

Another type of display is the conventional passive liquid crystal display in which many of the additional layers and witching elements required for AMLCDs are not needed. For example, a standard passive display will typically include a layer of LC material disposed between the electrodes, which are themselves disposed on opposing substrates. While being much simpler to fabricate than AMLCDs and other display devices, they possess several limitations which have hindered uptake in the marketplace. For example, these devices, due to their relatively slow response time, are incapable of displaying information at video rates.

Another major limitation of the passive display is the difficulty associated with fabricating full color displays. Current technology requires the use of three discrete displays, one stacked atop the others, and each display dedicated to a particular color, e.g., red, green or blue. In order to accomplish this, it is necessary to use three different twisted nematic liquid crystal materials matched according to the formula:

$$d\Delta\epsilon = n\lambda$$

Where:
  d=spacing between the discrete displays;
  $\Delta\epsilon$=is dielectric anisotropy
  n=is an integer
  $\lambda$=wavelength of light (i.e., color) of the display.

This matching of displays is presently done by using different spacing (d) for each color, with the result being difficulty in manufacturing and low yield. Manufacturing problems and low yield are exacerbated by the need for spacers to be disposed in the displays to maintain proper spacing between the opposing display substrates. The chance for inappropriate spacing mounts as additional displays are mounted one atop another.

Other manufacturing problems commonly associated with conventional passive LCDs relate to uniform flow through of the LC material between the display substrates, and high likelihood of contaminating an entire display (rendering it useless) from the flow of but a single contaminant into the LC material. These problems are particularly acute in STN and smectic chiral display devices.

Accordingly there exists a need to provide a new type of display device that addresses the needs of the marketplace for a low cost reliable LCD device that is free from the problems inherent in the prior art Such a device should be relatively easy to manufacture, provide high manufacturing yields, demonstrate high reliability, be low cost, and take advantage of currently available manufacturing infrastructure. This device should also be able to provide full color, dynamic viewing angle, and present a low profile.

SUMMARY OF THE INVENTION

The invention is directed to a liquid crystal display device comprising a first substrate having first and second major surfaces, and having at least one electrode formed on one of said major surfaces. Formed atop said electrode is a layer of a dielectric material, said layer of dielectric material having a plurality of opening formed therein. Into each opening is formed or deposited a layer of a light influencing material. A second substrate is disposed atop said layer of dielectric material.

In a second embodiment, a liquid crystal display device comprises a first display substrate having first and second major surfaces, said substrate having a plurality of display electrodes formed on one of said major surfaces. A layer of a dielectric material is disposed over said plurality of display electrodes, said dielectric layer having a plurality of openings formed therein, at least one such opening being formed over each said display electrode. A layer of liquid crystal material disposed in each of said openings.

The invention also contemplates a method of fabricating a liquid crystal display device comprising the steps of providing a substantially transparent substrate having at least one electrode formed on a surface thereof. Thereafter, a layer of a dielectric material is disposed on said substantially transparent substrate and said at least one electrode. An opening or openings is then formed through said layer of dielectric material. Finally, a layer of a light influencing material is disposed in each said opening, and a second substrate is provided atop said layer of dielectric material.

These and other advantages of the instant invention will be appreciated from a perusal of the detailed description and accompanying drawings.

BRIEF DESCRIPTION OF THE DRAWINGS

FIGS. 7 through 11 illustrate a series of steps involved in the fabrication of a liquid crystal display device in accordance with the instant invention.

DETAILED DESCRIPTION OF THE PREFERRED EMBODIMENT

Figure 1:
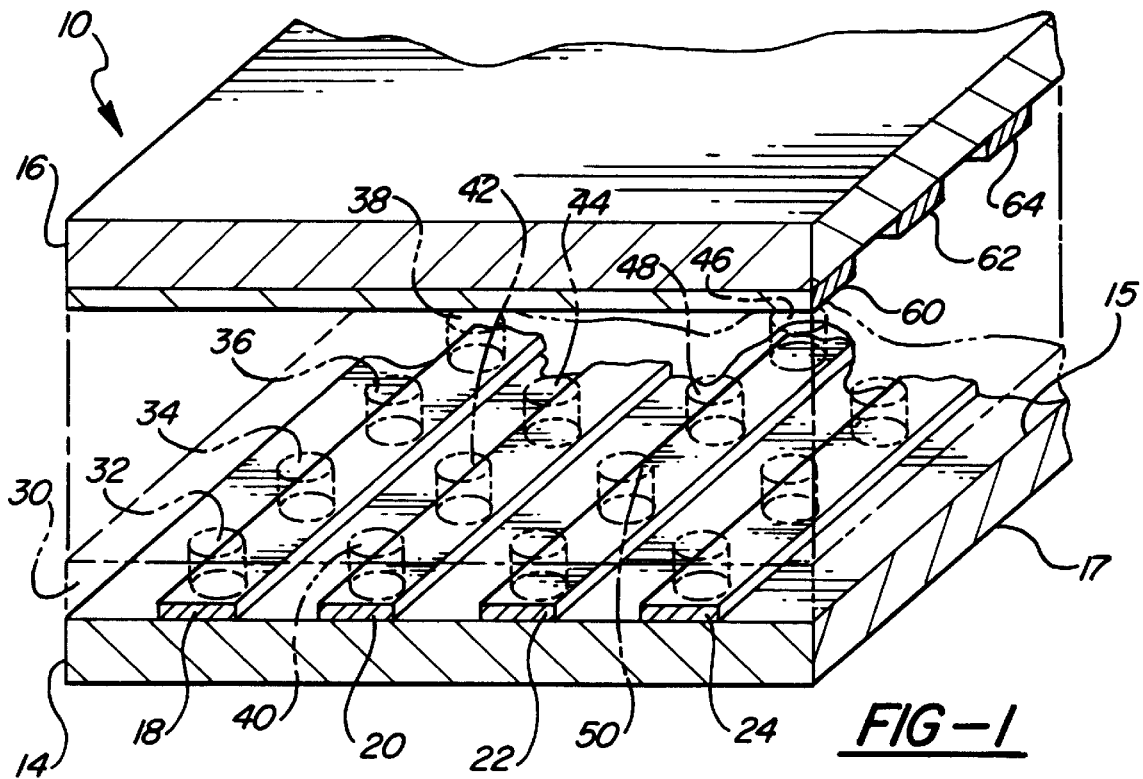
FIG. 1 is a perspective, cross-sectional view from the side of a liquid crystal display in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a perspective, cross sectional view taken along the side of a liquid crystal display (LCD) 10, in accordance with the instant invention. The LCD 10 includes first and second display substrates 14 and 16 arranged in spaced, parallel relationship to one another. The substrates 14 and 16 are preferably fabricated from one of a number of known materials in the art, examples including a series of display glasses manufactured by Corning, among others. Other types of glasses, plastics, ceramics and polymers may also be advantageously employed. Indeed, transparent plastics may be advantageously employed for purposes of making flexible display devices.

Substrate 14 has first and second major surfaces 15 and 17, surface 15 being disposed towards substrate 16. Disposed on surface 15 of substrate 14 is a series of disposed layers of electrically conductive material 18, 20, 22 and 24. The layers of electrically conductive material may be either transparent or opaque, depending on the nature of the display. For example, if the display device is intended to be used in a transmissive mode, i.e., with a backlight, then the layers of electrically conductive material are preferably substantially transparent, and may be fabricated from a transparent conductive oxide material selected from the group consisting of indium oxide, tin oxide, indium tin oxide, and other commonly known transparent conductive oxide materials.

Alternatively, the display may be used in the reflective mode in which ambiant light enters the display, and reflects off of a back reflector in the display. In such a case, the layers of conductive material may be fabricated of thin metal films such as silver, gold, copper, aluminum, tin and combinations thereof. Alternatively, doped semiconductor materials, and any of a host of other materials which may be substantially reflective and electrically conductive may be used. Layers 18, 20, 22, and 24 comprise the first substrate electrodes for display 10. It is to be noted that while FIG. 1 illustrates the display with only four first display substrate electrodes, the invention is not so limited. Indeed, the display 10 may comprise any number of electrodes arranged in any fashion.

Disposed upon electrically conductive layers 18, 20, 22 and 24, and indeed over the entire surface 15 of substrate 14 is a layer of a dielectric material 30. The purpose of the layer of dielectric material is many fold, and includes, but is not limited to, uniformly spacing the electrodes on the first substrate from those on the second substrate, and electrically insulating such electrodes from one another. The layer of dielectric material may be formed by depositing any of a number of different materials, either organic or inorganic. Examples of the types of material which may be used in forming layer 30 include any organic or inorganic dielectric material, polymers including polyimides, and other materials such as silicon oxides and silicon nitrides, and combinations thereof. The layer of dielectric material will have a thickness which varies depending upon the particular material used, though is typically in the range of between 1 and 20 microns thick, and preferably between 5 and 10 microns thick.

Formed through said layer of dielectric material is a plurality of openings or vias, for example 32, 34, 36, 38, 40, 42, 44, 46, 48 and 50. Note that while only ten vias or openings are identified, the display may comprise many, many more. Note also that while FIG. 1 shows the vias formed over both the substrate and the substrate electrode, the openings may in fact be limited to over the electrodes only. The location of the openings is easily controlled by common manufacturing techniques. For example, conventional photolithography allows for resolution on the level of Angstroms. Likewise, laser ablation is capable of submicron resolution. Accordingly, both of these techniques are acceptable for the formation of the vias, as are a number of other techniques known in the semiconductor fabrication industry. In practice, the size of the openings will vary depending upon, for example the resolution of the display desired, or the media disposed into the openings. Each of these will be elaborated upon hereinbelow. However, the diameter of the openings will typically vary between 2 and 100 micrometers, and is preferably in the range of 2 and 30 microns.

As noted above, any number of different media may be disposed into the openings. For example, and as noted above, in the context of a passive display, three different displays must be stacked one atop the other in order to provide a full color display, owing to the need to use three different types of liquid crystal material, each tuned to a different color. Using conventional ink jet technology, it is possible to fill each opening with a different LC material. Accordingly, and as an example, openings 32, 34, 36 may be filled with a first liquid crystal material matched for a red color, openings 38, 40, 42 may be filled with a liquid crystal material matched for a green color, and openings 44, 46 and 48 may be filled with a liquid crystal material matched for a blue color. Alternatively, and again using ink jet technology, different types of liquid crystal material may be disposed into the openings so as to create other optical effects, examples of which include nematic, smectic, cholesteric, chiral smectic, chiral nematic, polymer dispersed liquid crystal, polymer stabilized cholesteric textured, and combinations thereof. The liquid crystal material may be one of the materials as described hereinabove.

In an alternative embodiment, the openings may be filled with materials other than the liquid crystal material. For example, each opening may be filled with one of a selection of materials used for the alignment layer of a conventional liquid crystal display. In a conventional display, only a single alignment layer is used, resulting in but a single optical effect. Using different types of alignment materials in different openings will allow for differing optical effects over the face of the display, and indeed within each pixel. Examples of these optical effects include color, polarization, columation, alignment, and viewing angle to name but a few. The openings may also, or alternatively be filled with layers of a polarizing material. It is to be understood that these alternatives are not mutually exclusive: With a sufficiently thick layer of dielectric material, a layer of both, for example, liquid crystal material followed by a layer of polarizing material may be disposed in each opening. As alignment materials have been discussed herein, it is to be noted that the layer of dielectric material may serve the further function of providing the alignment for the liquid crystal material. For example, the layer of dielectric material, regardless of any other function, could also possess qualities necessary to induce adjacent liquid crystal material to align in a desired fashion upon application of an electrical field.

Thereafter, regardless of the nature of the materials disposed into the openings, the second substrate, having a plurality of second substrate electrodes formed thereon, is disposed over and in contact with the layer of dielectric material. It is to me noted that if the openings are filled with polarizing or alignment materials, then a layer of liquid crystal material is disposed over layer 30 and adjacent substrate 16 with electrodes 60, 62, 64. Note that in the embodiment of FIG. 1, the electrodes of the first substrate and those of the second substrate are arranged in perpendicular fashion so as to define a plurality of crossover points. Each crossover point defines a picture element which is operated by the application of an electrical charge to the liquid crystal material disposed between the two electrodes, regardless of whether the liquid crystal material is in the openings between the electrodes, or some other material (or materials) are in the openings, and the liquid crystal material is disposed thereover.

Figure 2:
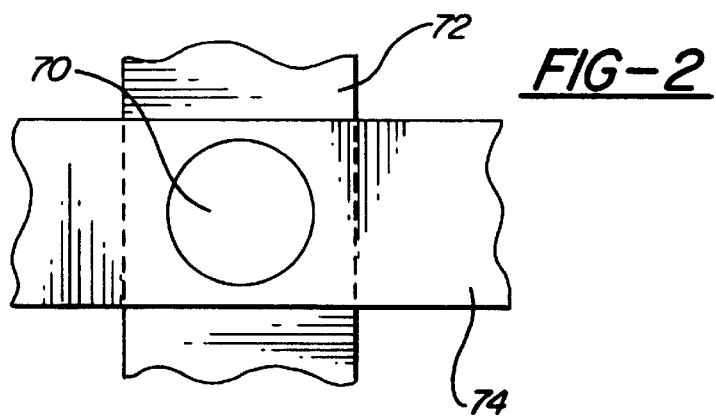
FIG. 2 is a view of a single picture element (pixel) in accordance with the invention.
Figure 3:
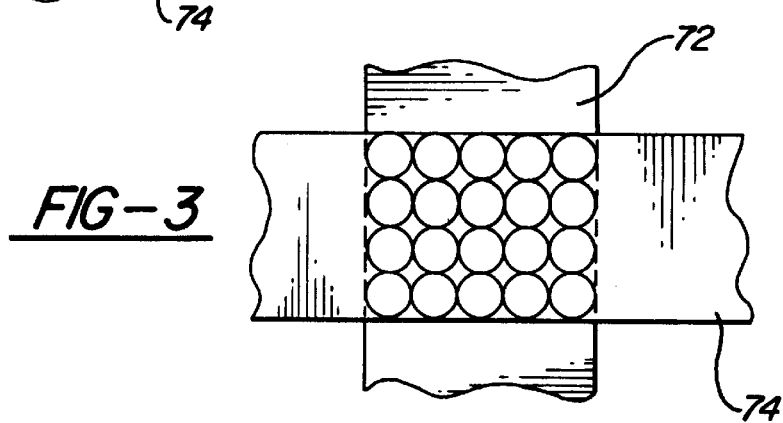
FIG. 3 is a view of a second pixel in accordance with the instant invention

Referring now to FIGS. 2 and 3 it is to be noted that each pixel created at each crossover point may include one or more openings in the layer of dielectric material between the electrodes of the first and second substrates. For example, and as illustrated in FIG. 2, the layer of dielectric material includes but a single opening 70 formed therein, and arranged at exactly the intersection of electrodes 72 and 74. Alternatively, each crossover point may include a plurality of openings in the dielectric layer. As illustrated in FIG. 3, the crossover point of electrodes 72 and 74 includes 20 openings arranged in a matrix of 4 by 5. Note that the manufacturing techniques identified above will easily allow this type of precision in the manufacturing process. The number and arrangement of the openings at each pixel will depend on the type of material to be disposed therein, and the desired purpose of the display.

Figure 4:
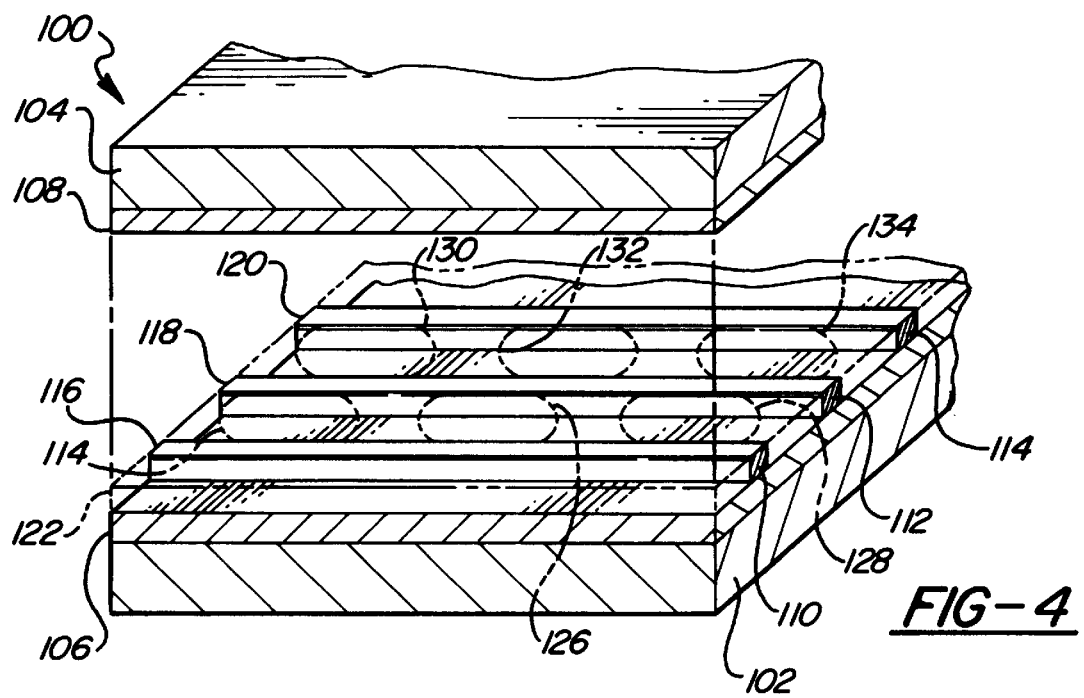
FIG. 4 is a perspective view of a second embodiment of a liquid crystal display device in accordance with the instant invention.
Figure 5:
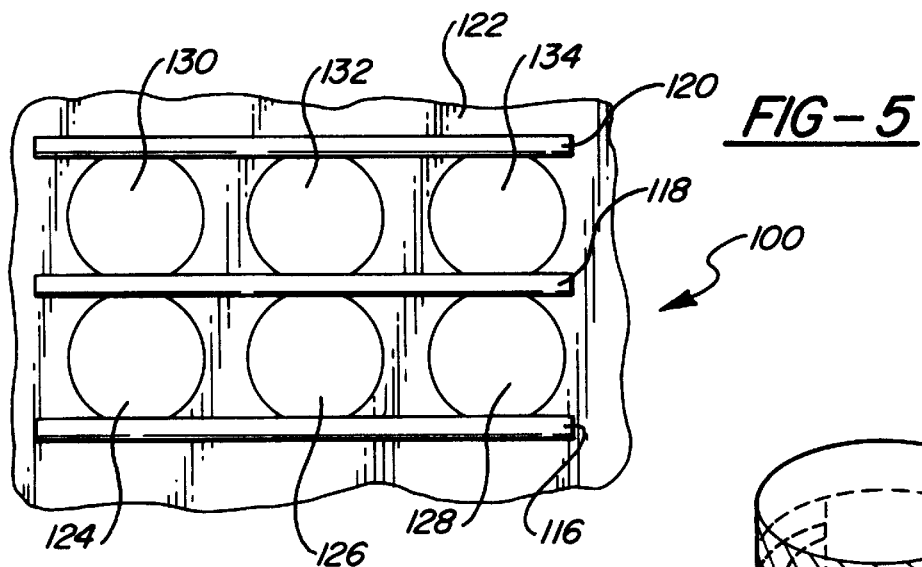
FIG. 5 is a top plan view of a second embodiment of a liquid crystal display device in accordance with the instant invention.

Referring now to FIGS. 4 and 5, there is illustrated therein, respectively, a perspective and top plan view of a second embodiment of a liquid crystal display device in accordance with the instant invention. The display device 100 includes first and second substrates 102 and 104, which may be fabricated of materials such as those described hereinabove with respect to FIG. 1. Disposed on each of substrates 102 and 104 is a layer of a conductive material 106 and 108 respectively, and which may be fabricated of the conductive materials described above with respect to FIG. 1. In a preferred embodiment, the conductive layers 106 and 108 are fabricated of a transparent conductive material, such as a transparent conductive oxide. One preferred transparent conductive oxide commonly employed in the field is indium tin oxide (ITO), which may be advantageously used herein. The thickness of the layer of ITO is as described above, and is well known to those of ordinary skill in the art.

Thereafter, disposed atop layer 106 is a patterned layer of an insulating material, dielectric material, either fabricated of dielectric materials as described hereinabove, or such other materials as are known in the art As noted the layer is patterned so as to form a series of elongated electrically insulating strips 110, 112, and 114. The insulating strips are provided to electrically insulate the layer of electrically conductive material 106 from a series of electrically conductive electrodes 116, 118 and 120 disposed thereon. The electrodes 116, 118 and 120 are preferably formed of electrically conductive materials such as those described hereinabove with respect to FIG. 1, which are then patterned to the desired shape and thickness, both of which are known to ordinarily skilled routineers in the liquid crystal display art.

Disposed around and atop electrically conductive layers 116, 118, and 120, and indeed over the entire surface layer 106 is a layer of a dielectric material 122. The purpose of the layer of dielectric material is many fold, and includes, but is not limited to, uniformly spacing the first substrate 102 (and all the associated display elements disposed thereon) from the second substrate 104, and electrically insulating such electrodes 116, 118 and 120 from the layer of electrically conductive material 108 disposed on substrate 104. The layer of dielectric material may be formed by depositing any of a number of different materials, either organic or inorganic. Examples of the types of material which may be used in forming layer 122 include those materials described hereinabove with respect to the layer of dielectric material. The layer of dielectric material will have a thickness which varies depending upon the particular material used, though is typically within the ranges described above.

Formed through said layer of dielectric material is a plurality of openings or vias, for example 124, 126, 128, 130, 132, and 134. Note that while only six vias or openings are identified, the display may comprise many, many more. The location of the openings is easily controlled by common manufacturing techniques. For example, conventional photolithography allows for resolution on the level of Angstroms. Likewise, laser ablation is capable of sub-micron resolution. Accordingly, both of these techniques are acceptable for the formation of the vias, as are a number of other techniques known in the semiconductor fabrication industry. In practice, the size of the openings will vary depending upon, for example the resolution of the display desired, or the media disposed into the openings. The diameter of the openings are typically as set forth above. As noted above, any number of different media may be disposed into the openings. Using, for example, conventional ink jet technology, it is possible to fill each opening with the same or a different LC material. Accordingly, and as an example, openings 124 and 130 may be filled with a first liquid crystal material, openings 126 and 132 may be filled with a second liquid crystal material, and openings 128 and 134 may be filled with a third liquid crystal material. Alternatively, and again using ink jet technology, different types of liquid crystal material may be disposed into the openings so as to create other optical effects. The liquid crystal material may be one of the materials as described hereinabove.

Figure 6:
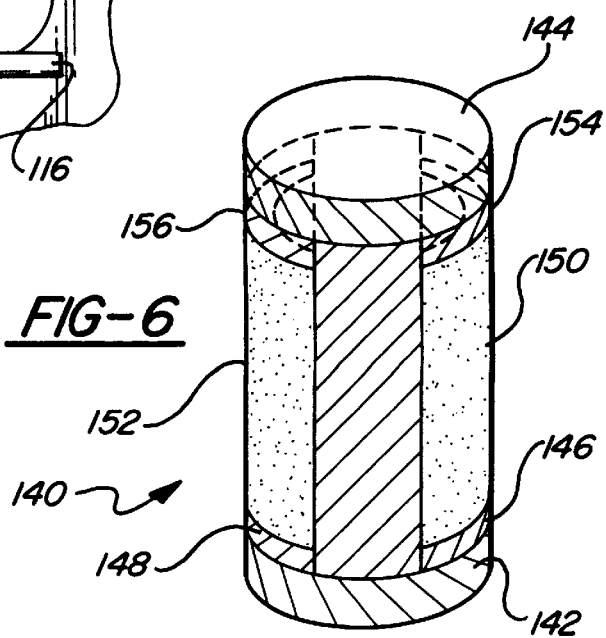
FIG. 6 is a view of a single liquid crystal picture element in a display as illustrated in FIGS. 4 and 5.

Referring now to FIG. 6, there is illustrated therein a view of a single liquid crystal display picture element 140 from a display as illustrated in FIGS. 4 and 5. The picture element 140 includes first and second electrodes 142 and 144 corresponding to layers 106 and 108 respectively. Electrically insulating layers 110 and 112 are illustrated in FIG. 6 by layers 146 and 148, upon which are disposed electrodes 150 and 152, corresponding to electrode layers 116 and 118. Electrodes 150 and 152 are insulated from electrode 144 by the layer of dielectric material 154, corresponding to layer 122. It is to be noted that layer 122 of FIGS. 4 and 5, as well as layer 154 of FIG. 6 may provide numerous other functions, all as described hereinabove. Disposed in via 156 is a layer of a liquid crystal material, again as described above.

In operation, the picture elements of the display illustrated in FIGS. 4–6 may be switched from a transparent to an opaque state (or made to provide another desired optical effect) by applying electrical signals to the electrodes. This may be done in any manner known to those of ordinary skill in the art, or as described in, for example, commonly assigned, co-pending U.S. patent application Ser. No. 08/996, filed on Dec. 22, 1998, in the name of Zvi Yaniv and entitled "MULTIPOLE LIQUID CRYSTAL DISPLAY" and U.S. application Ser. No. __/__, filed in the name of Zvi Yaniv, and entitled "MULTIPOLE LIQUID CRYSTAL DISPLAY AND METHOD OF OPERATING SAME."

Referring now to FIGS. 7–11 there is illustrated therein a series of steps for fabricating a display device in accordance with the instant invention. FIG. 7 illustrates the step of providing a display substrate 170 fabricated of a material such as those described hereinabove. Disposed on the substrate 170 is a layer of an electrically conductive material 172, again fabricated of a material as already described, such as ITO. Referring now to FIG. 8, the layer of ITO has been patterned as by conventional photolithography, laser ablation or other acceptable technique, so as to form a series of electrically conductive pads 174, 176, 178 and 180. The size and thickness of the conductive pads will depend on the desired size, applications and resolution of the display device, and are readily calculated by those of ordinary skill in the art.

Thereafter, and as illustrated in FIG. 9, a layer of a dielectric material 182, fabricated of materials described above, is deposited atop the substrate and conductive pads. The material may be deposited via conventional techniques, and is typically deposited to a depth of between 1 and 10 microns. Layer 182 is then patterned by, for example, conventional photolithography or laser ablation, so as to form one or more openings or vias over the conductive pads. Accordingly, and as is illustrated in FIG. 10, openings 184, 186 and 188 are formed over pad 174. Likewise, three openings are formed in FIG. 10 over each of conductive pads 176 and 178. It is to be noted that the number and exact spacing and relationship of the openings to each other are not limited to that shown in FIG. 10. Any number of openings may be provided, and in different spatial relationships to one another.

Referring now to FIG. 11, a second substrate 190, having a second layer of conductive material 192 disposed thereon, is positioned atop patterned layer 182 so as to seal openings 184, 186 and 188. Prior to sealing the second substrate to the patterned layer, an amount of a liquid crystal material (not shown) is disposed into each of the openings. Thereafter, as the second substrate is sealed to the patterned layer, the liquid crystal material is permanently enclosed in the openings. It is to be noted that an advantage of the instant display configuration is that there is not need for the glass spacer devices commonly employed in the display industry for assuring uniform spacing between the first and second substrates. This function is accomplished by the patterned layer 182.

Each of the picture elements in a display such as that illustrated in FIG. 11 are defined by a conductive pad, associated liquid crystal filled openings, and second substrate electrode. Accordingly, a single picture element in FIG. 11 is defined by conductive pad 174, liquid crystal material filled openings 184, 186 and 188, and layer 192. The optical characteristic of the liquid crystal material disposed in each of the openings may be switched from a first to a second optical state by applying an electrical impulse to conductive pad 174, in a manner well known to those of ordinary skill in the art.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A liquid crystal display device having a plurality of picture elements, said display comprising:
a first substrate having first and second major surfaces, and having at least one electrode formed on one of said major surfaces;
a layer of a dielectric material disposed atop said first substrate and said at least one electrode, said layer of dielectric material having a plurality of openings formed therein;
at least one layer of a light influencing material disposed in said openings; and
a second substrate disposed atop said layer of dielectric material, and having at least one electrode formed thereon;
wherein at least two of said openings correspond to each said picture element.

2. A liquid crystal display device as in claim 1, wherein said first substrate is fabricated of a substantially transparent material selected from the group of materials consisting of plastics, glasses and combinations thereof.

3. A liquid crystal display device as in claim 1, wherein said first substrate includes a plurality of electrodes formed on said first major surface.

4. A liquid crystal display device as in claim 3, wherein a cross-over of an electrode on said first substrate and an electrode on said second substrate defines a picture element.

5. A liquid crystal display device as in claim 3, wherein at least one opening is formed over each said electrode.

6. A liquid crystal display device as in claim 3, wherein a plurality of openings is formed over each said electrode.

7. A liquid crystal display device as in claim 1, wherein said layer of dielectric material is fabricated of a material selected from the group consisting of organic or inorganic polymers, polyimides, silicon oxides, silicon nitrides and combinations thereof.

8. A liquid crystal display device as in claim 1, wherein said layer of light influencing material further includes a layer of an alignment material.

9. A liquid crystal display device as in claim 8, wherein said layer of alignment material is selected from the group of materials consisting of organic or inorganic alignment materials, polyimides, lecitin, polyvinylalcohol, silicon monoxide, and combinations thereof.

10. A liquid crystal display device as in claim 1, wherein said layer of light influencing material is a layer of material adapted to impart a color to light passing therethrough.

11. A liquid crystal display device as in claim 10, wherein said layer of color imparting material is selected from the group of materials consisting of color inks, polyimide dyes, pigmented polyimides, and combinations thereof.

12. A liquid crystal display device as in claim 1, wherein said layer of light influencing material is a layer of liquid crystal material.

13. A liquid crystal display device as in claim 12, wherein said layer of liquid crystal material is selected from the group of materials consisting of nematic, smectic, cholesteric, chiral nematic, chiral smectic, polymer dispersed liquid crystals, polymer stabilized cholesteric texture, and combinations thereof.

14. A liquid crystal display device as in claim 1, wherein said second substrate is fabricated of a substantially transparent material selected from the group of materials consisting of plastics, glasses and combinations thereof.

15. A liquid crystal display device as in claim 1, wherein a plurality of different materials are used to fill said openings.

16. A liquid crystal display device as in claim 1, wherein said device is a reflective display device.

17. A liquid crystal display device as in claim 1, wherein said display is an active matrix display device.

18. A liquid crystal display device as in claim 1, wherein said second substrate is fabricated of a non-glass material.

19. A method of fabricating a liquid crystal display device having a plurality of picture elements, said method comprising the steps of:

providing a substantially transparent substrate having at least one electrode formed on a surface thereof;

disposing a layer of a dielectric material on said substantially transparent substrate and said at least one electrode;

for each said picture element, forming at least two openings through said layer of dielectric material;

disposing a layer of a light influencing material in each said opening; and providing a second substrate atop said layer of dielectric material.

20. A method as in claim 19, wherein the step of providing a substantially transparent substrate includes a further step of selecting said substantially transparent substrate from the group of materials consisting of plastics, glasses and combinations thereof.

21. A method as in claim 19, wherein the step of providing an electrode includes a further step of providing a plurality of electrodes formed on a first major surface.

22. A method as in claim 19, wherein the step of providing said layer of dielectric material includes a further step of fabricating said layer of a material selected from the group consisting of organic or inorganic polymers, polyimides, silicon oxides, silicon nitrides and combinations thereof.

23. A method as in claim 19, including a further step of forming at least one opening over each said electrode.

24. A method as in claim 19, including a further step of forming at least a plurality of openings is formed over each said electrode.

25. A method as in claim 19, wherein the step of providing a layer of light influencing material includes a further step of providing a layer of an alignment material with said light influencing material.

26. A method as in claim 19, wherein the step of providing a layer of light influencing material includes a further step of providing a layer of material adapted to impart a color to light passing therethrough.

27. A method as in claim 19, wherein the step of providing a layer of light influencing material comprises a further step of providing said layer as a layer of liquid crystal material.

28. A method as in claim 27, wherein said layer of liquid crystal material is selected from the group of materials consisting of nematic, smectic, cholesteric, chiral nematic, chiral smectic, polymer dispersed liquid crystals, polymer stabilized cholesteric texture, and combinations thereof.

29. A method as in claim 19, including a further step of providing a plurality of different materials to fill said openings.

30. A method as in claim 19, wherein each said electrode defines a picture element.

31. A method as in claim 19, wherein said openings are formed by laser.

32. A method as in claim 19, wherein said openings are formed by a chemical treatment.

* * * * *